United States Patent
Gonsalves et al.

(10) Patent No.: US 6,372,280 B1
(45) Date of Patent: Apr. 16, 2002

(54) STABLE FOAMS IN A HIGH ACID ENVIRONMENT

(75) Inventors: Alexander A. Gonsalves, Libertyville; Wen-Sherng Chen, Glenview; Donald C. Hannan, Grayslake; Rafael J. Marquez, Chicago; Krzysztof Mosiewicz, Glenview, all of IL (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/431,850

(22) Filed: Nov. 2, 1999

(51) Int. Cl.[7] ............................ A23L 1/035; A23C 23/00
(52) U.S. Cl. ........................ 426/564; 426/565; 426/586
(58) Field of Search ................................ 426/565, 580, 426/606, 564; 516/18

(56) References Cited

U.S. PATENT DOCUMENTS

| | | | |
|---|---|---|---|
| 3,924,018 A | * | 12/1975 | Sims et al. |
| 3,928,648 A | * | 12/1975 | Stahl et al. |
| 3,944,680 A | * | 3/1976 | Van Pelt et al. |
| 4,012,533 A | * | 3/1977 | Jonas |
| 4,107,334 A | * | 8/1978 | Jolly |
| 4,120,987 A | * | 10/1978 | Moore |
| 4,298,625 A | * | 11/1981 | Cillario |
| 4,331,689 A | * | 5/1982 | Shemwell |
| 4,370,353 A | * | 1/1983 | Yagi et al. |
| 4,396,638 A | * | 8/1983 | Edo et al. |
| 4,478,867 A | | 10/1984 | Zobel et al. ................. 426/570 |
| 4,505,943 A | * | 3/1985 | Dell et al. |
| 4,855,155 A | * | 8/1989 | Cavallin |
| 5,077,076 A | | 12/1991 | Gonsalves et al. ........... 426/565 |
| 5,384,146 A | | 1/1995 | Gonsalves et al. ........... 426/565 |
| 5,478,588 A | * | 12/1995 | Talignani |
| 5,609,904 A | * | 3/1997 | Koh et al. |
| 5,707,677 A | | 1/1998 | Gonsalves et al. ........... 426/564 |
| 5,759,609 A | | 6/1998 | Lynch ......................... 426/570 |
| 5,789,004 A | | 8/1998 | Hogan et al. ................. 426/96 |
| 5,897,905 A | * | 4/1999 | Bialek et al. |
| 5,962,058 A | * | 10/1999 | Ono et al. |
| 6,117,473 A | * | 9/2000 | Leshik et al. |

FOREIGN PATENT DOCUMENTS

| | | | |
|---|---|---|---|
| DE | 19615369 | * | 10/1996 |
| GB | 1476309 | * | 6/1977 |
| JP | 53-145959 | * | 12/1978 |
| JP | 7-255376 | * | 10/1995 |
| JP | 10-14494 | * | 1/1998 |
| WO | WO 97/05788 | | 2/1997 |

* cited by examiner

Primary Examiner—Nina Bhat
(74) Attorney, Agent, or Firm—Fitch, Even, Tabin & Flannery

(57) ABSTRACT

An acidic, foam having a pH of less than about 4, and preferably from about 2.5 to about 3.5, is provided. The foam is produced from a formulation which is a mixture of an emulsion component and an acidic component. The emulsion component contains water, a hard fat, a sweetener, whey protein, non-ionic stabilizer, and a non-ionic emulsifier. The acidic component contains an edible acid in an aqueous solution. The acidic component may optionally contain a milk protein source and a non-ionic emulsifier. The foam is useful as a whipped topping which has freeze thaw stability and can be kept at refrigeration temperature for at least three weeks.

15 Claims, No Drawings

STABLE FOAMS IN A HIGH ACID ENVIRONMENT

FIELD OF THE INVENTION

The present invention is directed to stable, acidic foams, such as frozen whipped toppings, having a pH less than about 4.0, and preferably in the range of about 2.5 to about 3.5. More particularly, the present invention is directed to providing formulations that can produce stable foams in a high acid environment.

BACKGROUND OF THE INVENTION

Compositions and processes for preparing either dairy or non-dairy frozen whipped toppings are known in the art. U.S. Pat. No. 3,431,717 to Lorant; U.S. Pat. No. 4,411,926 to Trumbetas et al.; U.S. Pat. Nos. 4,251,560, 4,451,452, and U.S. Pat. No. 4,505,943 to Dell et al.; and U.S. Pat. No. 4,478,867 to Zobel et al. relate to such compositions and processes. The disclosures of these patents enable the production of freeze-thaw stable, frozen whipped toppings which are distributed as frozen products, which are thawed prior to use, and which can be stored in the refrigerator for up to 21 days without textural breakdown. The aforementioned prior art patents relate to frozen whipped toppings wherein the fat content is about 20 percent or more. U.S. Pat. No. 5,077,076 to Gonsalves et al. discloses milk solids and phosphate salt-containing formulations and processes which have enabled the production of comparably stable, frozen whipped topping having a fat content reduced to 15 percent or below.

U.S. Pat. No. 5,384,146 to Gonsalves et al. is directed to frozen whipped topping formulations containing milk solids and glassy sodium polyphosphates having an average chain length of at least 18 to 50. U.S. Pat. No. 5,707,677 to Gonsalves et al. is directed towards a fat-free/low-fat frozen whip topping formulated with 0.5 to 3 percent starch. To prevent exposing the starch to high shear conditions, the starch was added to an homogenized emulsion in the form of an aqueous preblend.

PCT Publication WO 97/05788 relates to a food dressing containing of an aqueous phase and 0 to 40 weight percent fat and/or oil, further containing a non-ionic thickening agent and an electrolyte having a pH not greater than 4, and which also contains 3 to 8 weight percent of heat denatured globular protein. This dressing is prepared by a process comprising the steps of: (a) dissolving a globular protein, a non-ionic thickening agent and an electrolyte in water, (b) adjusting the pH to less than 4 by adding acid, (c) heating and slowly stirring the solution so that protein denaturation occurs, (d) cooling, (e) optionally admixing other ingredients, where, optionally, step (d) follows step (e).

The above-described prior art relating to frozen whipped toppings universally provide a frozen whipped topping having a pH of greater than about 4. Under some circumstances and using certain flavors, it is desirable to provide a frozen whipped topping having a low pH (i.e., less than about 4.0 and preferably in the range of about 2.5 to about 3.5). It is also desirable to provide a frozen whipped topping made with dairy or dairy-derived proteins and which has a low pH (i.e., less than about 4.0 and preferably in the range of about 2.5 to about 3.5). Examples of products which are especially suitable for the practice of this invention include frozen whipped toppings containing fruit, fruit flavors and/or fruit coloring and frozen whipped toppings for use with acidic beverages or acidic desserts, such as gelatin gels and yogurt (as a topping or in a parfait-type product).

For many years, the factors that provide and/or contribute to food emulsion and foam stability have been discussed extensively in the literature. The stability of food emulsions and foams is very complex because it covers a wide variety of systems, such as whipped toppings, ice creams, confections, dressings and sauces, and beverages. It has been found that foam and emulsion film formation, structure, and stability are controlled by short and long range forces operating between the two film surfaces. These, in turn, are generally influenced by the properties of surfactant absorbed layers and surfactant micelles or other colloidal particle volume fraction. The makeup of the adsorbed layer or layers are greatly dependent on the types and/or concentrations of the surface active ingredients. The more surface active chemical emulsifiers in whipped toppings are preferentially adsorbed. Such adsorbed emulsifiers restrict the amounts of other surface active ingredients which are adsorbed.

Foam properties are also strongly dependent upon foam film properties. Proteins serve as the principle surfactant and foam film membrane in many food emulsions and foams. Most food proteins lose solubility and surface activity at low or reduced pH's (less than 6.0). Nonionic chemical emulsifiers (polysorbate and sorbitan monostearate) are less affected by this change. Sodium caseinate is the protein of choice in frozen whipped toppings; it generally serves as the principal emulsifier (oil/water interface) and air cell membrane (air/water interface). Sodium caseinate readily precipitates at its isoelectric point (pH 4.6 to 4.8) and becomes less effective at reduced pH's (less than 6.0). Also, anionic gums and/or hydrocolloids such as xanthan, carboxy methylcellulose, pectin and others, complex readily with proteins to form precipitates at pH values below the protein's isoelectric points and therefore, can prevent the protein from being surface active.

In contrast, whey proteins (e.g., beta-lactoglobulin and alpha-lactalbumin) are more soluble and remain surface active at these reduced pH values. Because of the protein's diminished surface activity at a reduced pH, low levels of polysorbate and sorbitan monostearate allow higher concentrations of proteins to adsorb at fat and air interfaces to form effective emulsion and foam films. Accordingly, it is a principal object of the present invention to provide formulations having a low pH (i.e., less than about 4.0 and preferably in the range of about 2.5 to about 3.5) that can provide freeze-thaw stable foams which can be stored frozen or stored at refrigeration temperatures and which can be used as a whipped topping. The stable foams of the present invention can be flavored with natural and artificial flavorants.

SUMMARY OF THE INVENTION

An acidic foam having a pH less than about 4.0, and preferably in the range of about 2.5 to about 3.5, and having freeze thaw stability is provided. The foam is produced using a formulation which is a mixture of an emulsion component and an acidic component. The emulsion component contains water, a hard fat, a sweetener, whey protein, a non-ionic stabilizer, and preferably a non-ionic emulsifier. The acidic component contains an edible acid and preferably is an aqueous solution. Preferably, the acidic component also contains a milk protein source and a non-ionic emulsifier. Suitable milk protein sources include, for example, yogurt, milk solids, and the like. The acidic component may also contain other desirable components such as, for example, fruit puree, fruit flavor, fruit colorants, other flavors, other colorants, and the like. The amount of the acidic component combined into the mixture is sufficient to adjust the pH of the finished product to a value less than about 4, and preferably to a value between about 2.5 and about 3.5.

DETAILED DESCRIPTION OF THE INVENTION

An acidic whipped topping having a pH of less than about 4.0 is provided. The whipped topping is freeze-thaw stable and can be stored at refrigeration temperatures (i.e., about 35 to 45° F.) for at least three weeks. The topping is prepared by homogenizing an emulsion component and adding an acidic component to adjust the pH of the mixture to the desired level. Generally, the overall composition of the whipped topping is about 75 to about 90 percent of the emulsion component and about 10 to 25 percent of the acidic component. Preferably, the whipped topping has a pH in the range of about 2.5 to 3.5. The whipped toppings of this invention are generally and preferably sold to consumers in a frozen form; such products can, however, be sold as refrigerated products if desired.

The emulsion component generally comprises an aqueous emulsion containing a hard fat, a sweetener, whey protein, a non-ionic stabilizer, and preferably a non-ionic emulsifier. Although not wishing to be limited by theory, it appears that the combination of non-ionic emulsifiers, non-ionic stabilizers, and whey protein is beneficial in the preparation of a low-pH, whipped topping that is freeze-thaw stable and that can be stored at refrigeration temperatures (i.e., about 35 to 45° F.) for at least three weeks. Preferably, the emulsion component is prepared at neutral pH conditions (i.e., a pH of about 6.0 to about 6.8) to ensure optimum protein performance (i.e., conditions wherein the proteins can act as the principal emulsifier (oil/water interface) and air cell membrane stabilizer (air/water interface)) and to maximize the emulsifying properties of the whey protein. The emulsion component will generally contain about 35 to about 45 percent water (i.e., including water derived from the other components). The hard fat used in the emulsion component is preferably a fully hydrogenated vegetable oil. The hard fat is preferably selected from the group consisting of coconut oil, palm kernel oil, soybean oil, corn oil, cottonseed oil, and safflower oil. More preferably, the hard fat is coconut oil, palm kernel oil, or combinations thereof. The hydrogenated vegetable oil preferably has a solid fat content (SFC) of about 25 to about 50 percent solids at a temperature of about 25° C. and an iodine value of less than about 3.0. Generally the emulsion component will contain about 6 to about 24 percent hard fat.

The sweetener is preferably a corn syrup having a DE of from about 35 to about 50, a high fructose corn syrup, dextrose, sucrose, or a combination thereof. The sweetener is generally present in the emulsion component at about 40 to about 55 percent, preferably about 48 to about 52 percent (solids basis). Preferably, the sweetener is a mixture containing about 30 to about 45 percent corn syrup, about 30 to about 45 percent high fructose corn syrup, and about 10 to about 40 dextrose. The composition of sweetener can be used to adjust both the overall sweetness and overall solids content of the whipped topping. For example, high fructose corn syrup (about 70 percent solids) is about 2.5 times sweeter than 42 DE corn syrup (about 80 percent solids). Depending on the sweetness and solids levels desired in the final whipped topping, the relative amounts of high fructose corn syrup and corn syrup can be adjusted. Generally, overall solids levels of about 40 to 55 percent are desired in the whipped topping.

The whey protein may be selected from the group consisting of whey protein isolate, whey protein concentrate, dried whey, and combinations thereof. Preferably the whey protein is a whey protein isolate since it generally has less potentially interfering minerals or salts. Whey protein isolate generally contains about 88 to about 93 percent protein, about 0.2 percent lactose, about 1.9 percent ash, and about 5 percent moisture. Whey protein concentrate generally contains about 70 to about 80 percent protein, about 11 percent lactose, about 4.5 percent fat, about 4 percent ash, and about 4 percent moisture. Dried whey generally contains about 10 to about 15 percent protein, about 70 percent lactose, about 1.1 percent fat, about 8 percent ash, and about 5 percent moisture. As those skilled in the art will realize, the compositions of such whey protein source materials can vary depending on the supplier. Generally, the emulsion component will contain about 0.5 to about 5 percent whey protein, preferably about 0.7 to about 1.5 percent.

The non-ionic stabilizer may be any suitable non-ionic stabilizer know to the food industry. One especially preferred non-ionic stabilizer is guar gum. Other suitable non-ionic stabilizers include, for example, locust bean gum (carob), tara gum, konjac, unmodified starches, unmodified cellulose, methylcellulose, ethylcellulose, and the like. Preferably, the non-ionic stabilizer is present at a level of from about 0.2 to about 0.8 percent by weight of the emulsion component and more preferably at about 0.3 to about 0.6 percent. If desired, such non-ionic stabilizers can also be included in the acidic component.

The non-ionic emulsifier may include any suitable non-ionic emulsifier known to the food industry. Examples of such non-ionic emulsifiers include monoglycerides, acetylated monoglycerides, ethoxylated monoglycerides, sorbitan esters, sorbitan monostearates, diacetyl tartaric acid esters of monoglycerides, diacetyl tartaric acid esters of diglycerides, and polysorbates. The non-ionic emulsifier is preferably selected from the group consisting of polysorbates and sorbitan monostearate. Generally, non-ionic emulsifiers having a HLB value of about 10 to 16 are preferred. Generally the level of non-ionic emulsifier in the emulsion component is about 0.02 to about 0.3 percent, and more preferably at about 0.04 to about 0.2 percent. Most preferably, a mixture of non-ionic emulsifiers is used; one such preferred mixtures includes polysorbates at a level of from about 0.05 to about 0.15 percent and sorbitan monostearate at a level of from about 0.05 to about 0.15 percent. Preferred polysorbates include Polysorbate 60 (polyoxyethylene (20) sorbitan monostearate) and Polysorbate 65 (polyoxyethylene (20) sorbitan tristearate), with Polysorbate 60 being most preferred.

The acidic component is essentially an edible acid in an aqueous solution. It may contain, if desired, a milk protein source and/or a non-ionic emulsifier. The edible acid may be any suitable food grade acid, but is preferably selected from the group consisting of phosphoric acid, hydrochloric acid, sulfuric acid, lactic acid, citric acid, and combinations thereof. More preferably, the edible acid is phosphoric acid. The edible acid is present in the acidic component at a level sufficient, when combined with the emulsion component, to provide a pH of less than about 4.0, and preferably about 2.5 to about 3.5, for the whipped topping. Generally and using phosphoric acid (80%) as an example, the edible acid is present in the acidic component at a level of about 0.2 to about 0.6 percent. Of course, lower or higher amounts of edible acid may be included so long as the amount of the added acidic component is adjusted to obtain the desired pH of the final whipped topping. Generally, the amount of edible acid is adjusted to a level in the acidic component which allows the preparation of the final whipped topping with the desired pH using about 10 to about 25 percent of the acidic component and about 75 to about 90 percent of the emulsion component.

A milk protein source can be included, if desired, in the acidic component at levels of up to about 80 percent. Preferably, the milk protein source, if included in the acidic component, is present at about 70 to about 80 percent. The milk protein source of the acidic component is preferably selected from the group consisting of yogurt -cultured skim milk, skim milk, skim milk concentrates, reconstituted non-fat milk solids and combinations thereof. Generally, the solids level of the milk protein source is in the range of from about 5 to about 15 percent, and preferably about 7 to about 11 percent. Thus, as one of ordinary skill in the art would realize, such aqueous milk protein source could be used in place of, or in addition, to any water added to form the acidic component. If desired, a non-ionic emulsifier can also be included in the acidic component. Such a non-ionic emulsifier in the acidic component may be the same or different from the non-ionic emulsifier used in the emulsion component. Any non-ionic emulsifier included in the acidic component should, of course, be water soluble at low pH's. The non-ionic emulsifier in the acidic component, if used, is preferably a polysorbate (especially Polysorbate 60), but other suitable non-ionic emulsifiers may be emulsifiers may be used. The non-ionic emulsifier, if used, is present in the acidic component at a level of from about 0.04 to about 0.08 percent.

The emulsion component is prepared by mixing together the components of the emulsion component and then passing the mixture through a homogenizer. The acidic component is prepared by mixing together the desired components. The acidic component is then combined with the emulsion component with mixing to provide a whipped topping formulation. Generally, the acidic and emulsion components are combined with vigorous mixing to minimize protein precipitation. More particularly, the acidic component is combined with the emulsifier component at a level sufficient to provide a pH in the combined mixture of less than about 4.0 and preferably from about 2.5 to about 3.5. Generally, the emulsion component is present in the mixture at a level of from about 75 to about 90 percent and the acidic component is present in the mixture at a level of from about 10 percent to about 25 percent. As those skilled in the art will realize, higher or lower amounts of the acidic component may be used so long as the pH is within the desired range and the resulting whipped topping has acceptable consistence and texture.

The final concentrations of the various ingredients in the whipped topping will, of course, depend on their amounts in the emulsion and acidic components and in the relative amounts of the emulsion and acidic components used to prepare the whipped topping. Generally, an overall solids content of about 40 to about 55 percent is desired, with a preferred solids content of about 42 to about 48 percent. In one embodiment, the whipped topping of the present invention (i.e., the product formed from combining the emulsion and the acidic components) will generally contain about 5 to about 20 percent of hard fat, about 0.5 to about 1.5 percent of whey protein, about 0.1 to about 1.5 percent of non-ionic stabilizer, about 0.05 to about 0.5 percent of non-ionic emulsifier, sufficient edible acid to provide a pH of less than about 4.0, and sufficient sweetener to provide the desired level of sweetness and the target solids level. In another embodiment, the frozen whipped topping of the present invention (i.e., the product formed from combining the emulsion and the acidic components) will additionally contain about 0.1 to 1% milk protein which may be added as about 0.26 to 2.6% milk solids non-fat. The amount of sweetener will, of course, vary depending on the levels of sweetness and overall solids desired. As discussed above, specific sweetener compositions can be used wherein relative amounts of the sweetener components (e.g., high fructose corn syrup and 42 DE corn syrup) can be varied to obtain desired sweetness levels at a desired solids content. Generally, the whipped toppings of the present invention contain about 40 to about 55 percent solids, and preferably about 42 to about 48 percent solids.

Frozen whipped topping in accordance with this invention may be prepared generally in accordance with the general processes set forth in U.S. Pat. No. 4,451,492 to Dell et al., U.S. Pat. No. 4,478,867 to Zobel et al., U.S. Pat. No. 5,077,076 to Gonsalves et al., and U.S. Pat. No. 5,707,677 to Gonsalves et al., all of which are hereby incorporated by reference. Accordingly, the ingredients of the emulsion component are batched and the formulation is pasteurized and homogenized at a pressure of at least 6,000 psi. The homogenized and pasteurized mixture is cooled to about 40° F.(4.4° C.) and then held for at least 45 minutes in order to permit the fat to crystalize. Although not wishing to be limited by theory, there may be at least some protein conformational changes or rearrangements during this hold period. The resulting emulsion is then mixed with the acidic component to obtain the desired pH.

The mixture is aerated in a continuous mixer having a mixing pressure of from about 45 to 100 psig and a mixing temperature of from about 40E to about 55° F. (4.4 to 12.80° C.), thereby incorporating air or an inert gas (e.g., nitrogen or carbon dioxide) in an amount sufficient to produce an overrun in the final product of about 200 to about 350 percent (v/v), and preferably about 220 to about 300 percent (v/v). The pressure of the aerated emulsion is then reduced by about 10 to 60 psig in a continuous and gradual manner by conventional means, such as conveying the emulsion through one or more tubes or pipes having a diameter and length sufficient to effect the desired, gradual pressure reduction to atmospheric pressure. The pressure reduction should be sufficiently gradual so as to prevent or minimize the abrupt expansion of air cells to prevent destabilization of the product. Preferably, this pressure reduction step occurs over a period of at least 5 seconds in order to permit equilibration of air cells. Of course, the desired duration of this pressure reduction will vary considerably depending on the equipment size, flowrates, product density, and the like. The determination of such rate of the pressure reduction is within the ordinary skill in the art and can be determined by routine experimentation for a given manufacturing plant or system.

The pressure-reduced emulsion is then whipped. Whipping may be done in an open mixer, such as a Hobart™ mixer, but preferably is done in a closed vessel, such as a jacketed, scraped-surface heat exchanger. According to a preferred embodiment, whipping is done at a pressure of about 20 to about 70 psig and a temperature of about 40 to about 60° F. (4.4 to 15.6° C.). The closed vessel may, in fact, be comprised of a plurality of connected heat exchangers in order to better control the temperature and pressure of the emulsion in the preferred ranges during whipping. As noted in the Zobel et al. patent, the amount of shear employed during the whipping step is controlled in order to produce a product with the desired texture.

After the product has been whipped to the desired extent, the pressure is then reduced to atmospheric pressure in a gradual and continuous manner. This pressure reduction may also be effected by means of a length of pipe or tubing having the appropriate diameter and length. Again, the pressure reduction should be sufficiently gradual so as to prevent or minimize the abrupt expansion of air cells to prevent destabilization of the product. Of course, the desired duration of this pressure reduction will vary considerably depending on the equipment size, flowrates, product density, and the like. The determination of such rate of the pressure reduction is within the ordinary skill in the art and can be determined by routine experimentation for a given manufacturing plant or system. Upon reaching atmospheric pressure, the temperature of the whipped emulsion should be from about 50 to about 60° F. (10.0 to 15.6° C.). Other conventional techniques could, of course, be used to allow the product to gradually reach atmospheric pressure. In a typical plant operation, the whipped emulsion is then passed to a filler, packaged in containers for retail sale, and frozen at 0° F. (−17.8° C.) or below.

The following example further illustrates various features of the invention, but is not intended to in any way limit the scope of the invention as defined in the appended claims. Unless otherwise noted, all percentages are by weight.

EXAMPLE

The following formulations were used to prepare an emulsion component and an acidic component. These components were designed to provide finished whipped toppings with a pH of about 3.8. Acidic components were prepared using either yogurt-cultured skim milk or skim milk.

Emulsion Component:

| Ingredients | Amount (%) |
| --- | --- |
| Water | 41.6 |
| Hydrogenated Coconut/Palm Kernel Oil | 15.5 |
| Corn Syrup 42DE | 15.7 |
| HFCS 42 (High Fructose Corn Syrup) | 15.7 |
| Dextrose | 9.5 |
| Whey Protein Isolate | 1.2 |
| Artificial Yogurt Flavor | 0.2 |
| Artificial Berry Flavor | 0.06 |
| Polysorbate 60 | 0.01 |
| Sorbitan Monostearate | 0.01 |
| Guar Gum | 0.4 |
| Red 40 (10% solution) | 0.04 |

Acidic Component Containing Yogurt-Cultured Skim Milk:

| Ingredients | Amount (%) |
| --- | --- |
| Water | 21.7 |
| Yogurt-Cultured Skim Milk | 76.4 |
| Phosphoric Acid (80%) | 1.8 |
| Polysorbate 60 | 0.06 |

Acidic Component Containing Non-fat Milk Solids:

| Ingredients | Amount (%) |
| --- | --- |
| Water | 21.4 |
| Skim Milk | 76.4 |
| Phosphoric Acid (80%) | 2.1 |
| Polysorbate 60 | 0.06 |

Order of Ingredient Addition for Preparation of Low pH Frozen Whipped Topping

The emulsion is preferably prepared at neutral pH conditions to ensure optimum whey protein emulsifying performance. A second stream consisting of the acidic component is then combined with the emulsion component at a ratio of about 17:83 to produce a final pH of less than about 4.0 and preferably between about 2.5 to about 3.5. Flavors that are free of or low in acid can be added to the emulsion if desired. This helps maintain careful control of conditions and point of acidification. Keeping the emulsion at or close to neutral pH values until the acidic component is added appears to reduce or eliminate protein precipitation. Flavors which are acidic (as well as low acidic flavors) could also be incorporated in the acidic component; in such cases, the amount of acid in the acidic component should be appropriately reduced in order to obtain the desired pH value in the finished product. A small amount of a polysorbate emulsifier, preferably Polysorbate 60, is added to the acid component stream to lower surface tension and help with air incorporation (whipping) without affecting emulsification. Phosphoric acid was used as the acidulate in this example, but other food grade acids could be used with equal effectiveness.

EMULSION PREPARATION

1. Pump portion of formula water into a batch tank.
2. Add the Red #40 to the tank.
3. Add coconut/palm kernel oil blend to the batch tank.
4. Activate the heating system to bring the system to at least 140° F.
5. Add Polysorbate 60 to the batch tank
6. Slowly add the sorbitan monostearate to the batch tank. The tank contents should be at least 140° F.
7. Add the whey protein to the tank.
8. Add guar gum and dextrose (these ingredients can be preblended if desired).
9. Add the high fructose corn syrup and 42 DE corn syrup.
10. Increase the tank temperature to about 150 to about 165° F. and hold for about 10 to 15 minutes.
11. Add flavors five minutes prior to pumping the batch to the homogenizer.
12. Homogenize in a two stage homogenizer; set the 2nd stage at 500 psi and bring the total pressure to 8,000 psi with the 1 st stage.
13. Cool emulsion to 40° F.
14. Collect in a jacketed tank and hold at 40±0.5° F. for not less than 20 minutes to allow the fat to form a stable crystalline structure.

Acidic Component—Incorporating Yogurt-Cultured Skim Milk

1. Add water to a mixing vessel.
2. Add appropriate level of acid to the water.
3. Add polysorbate 60.
4. Add yogurt cultured skim milk (about 9.0 percent solids) to the acid solution under vigorous mixing with a Turbo™ mixer or other high shear mixer.
5. If necessary, mix for 10 minutes in a standard batch tank at about 135 to about 140° F.
6. Cool to refrigeration temperatures (e.g., about 40° F.).
7. Combine with emulsion component with mixing to rapidly equilibrate to a uniform pH and holding at about 40° F. for about 10–30 minutes to obtain a uniform topping.
8. The combined emulsion and acidic components are then aerated and whipped to provide the whipped topping which can be packaged and frozen for distribution By varying the amount of phosphoric acid (or other acid) added to the acidic component, the pH of the finished product can be varied. For example, using 1.8 percent phosphoric acid (80%) in the acidic component containing the yogurt-cultured skim milk provides a finished product with a pH of about 3.8. Increasing the phosphoric acid (80%) level to 2.5 (along with a corresponding decrease in the amount of water) in the acidic component provides a finished product with a pH of about 2.5.

Acidic Component—Incorporating Non-fat Milk Solids (NFMS)

1. Prepare a NFMS solution (about 9.0 percent solids) at about 140 to about 145° F.
2. Add water to a mixing vessel.
3. Add appropriate level of phosphoric acid to the water.
4. Add polysorbate 60.
5. Add NFMS solution to the acid solution under vigorous mixing with a Turbo mixer or other high shear mixer.
6. If necessary, mix for 10 minutes in a standard batch tank at 135–140° F.
7. Cool to refrigeration temperatures (e.g., about 40° F.).
8. Combine with emulsion under mixing to rapidly equilibrate to a uniform pH and hold at about 40° F. for about 10–30 minutes to obtain a uniform topping.
9. The combined emulsion and acidic components are then aerated and whipped to provide the whipped topping which can be packaged and frozen for distribution.

By varying the amount of phosphoric acid (or other acid) added to the acidic component, the pH of the finished product can be varied. For example, using 1.8 percent phosphoric acid (80%) in the acidic component containing the non-fat milk solids provides a finished product with a pH of about 3.8. Increasing the phosphoric acid (80%) level to 2.5 (along with a corresponding decrease in the amount of water) in the acidic component provides a finished product with a pH of about 2.5.

The whipped toppings prepared in accordance with this invention will have a pleasant tart taste which is very compatible with fruit flavors. The toppings will have an appearance, mouthfeel and texture akin to conventional frozen whipped toppings. The product is stable through multiple freeze-thaw cycles, at refrigeration conditions for three weeks and at freezer conditions for more than one year.

What is claimed is:

1. An acidic foam comprising a mixture of an emulsion component and an acidic component, wherein the emulsion component comprises water, hard fat, sweetener, whey protein, and non-ionic stabilizer; wherein the acidic component comprises an edible acid in an aqueous solution; and wherein the mixture has a pH of about 2.5 to about 3.5.

2. The foam in accordance with claim 1, wherein the mixture contains about 5 to about 20 percent of hard fat, about 0.5 to about 1.5 percent of whey protein, about 0.1 to about 1.5 percent of non-ionic stabilizer, and about 0.05 to about 0.5 percent of non-ionic emulsifier.

3. The foam in accordance with claim 1, wherein the acidic component further comprises a milk protein source and a non-ionic emulsifier.

4. The foam in accordance with claim 3, wherein the mixture contains about 5 to about 20 percent of hard fat, about 0.5 to about 1.5 percent of whey protein, about 0.1 to about 1.5 percent of non-ionic stabilizer, about 0.05 to about 0.5 percent of the non-ionic emulsifier, and about 0.1 to 1 percent of milk protein.

5. The foam in accordance with claim 1, wherein the mixture contains about 75 to about 90 percent of the emulsion component and about 10 to about 25 percent of the acidic component.

6. The foam in accordance with claim 3, wherein the mixture contains about 75 to about 90 percent of the emulsion component and about 10 to about 25 percent of the acidic component.

7. The foam in accordance with claim 2, wherein the overall solids contents is about 40 to about 55 percent; wherein the hard fat is hydrogenated vegetable oil selected from the group consisting of coconut oil, palm kernel oil, soybean oil, corn oil, cottonseed oil, safflower oil and combinations thereof; wherein the sweetener is selected from the group consisting of corn syrup, high fructose corn syrup, dextrose, sucrose and combinations thereof; wherein the whey protein is selected from the group consisting of whey protein isolate, whey protein concentrate, dried whey and combinations thereof; wherein the non-ionic stabilizer is selected from the group consisting of guar gum, locust bean gum, tara gum, konjac, unmodified starches, unmodified cellulose, methylcellulose, ethylcellulose and combinations thereof; wherein the non-ionic emulsifier is selected from the group consisting of polysorbates, sorbitan monostearate and combinations thereof; and wherein the edible acid is selected from the group consisting of phosphoric acid, hydrochloric acid, sulfuric acid, lactic acid, citric acid and combinations thereof.

8. The foam in accordance with claim 2, wherein the hard fat is a blend of coconut oil and palm kernel oil, the edible acid is phosphoric acid and the non-ionic stabilizer in guar gum.

9. The foam in accordance with claim 7, wherein the non-ionic emulsifier is a blend of polysorbate and sorbitan monostearate.

10. The foam in accordance with claim 4, wherein the overall solids contents is about 40 to about 55 percent; wherein the hard fat is hydrogenated vegetable oil selected from the group consisting of coconut oil, palm kernel oil, soybean oil, corn oil, cottonseed oil, safflower oil and combinations thereof; wherein the sweetener is selected from the group consisting of corn syrup, high fructose corn syrup, dextrose, sucrose and combinations thereof; wherein the whey protein is selected from the group consisting of whey protein isolate, whey protein concentrate, dried whey and combinations thereof; wherein the non-ionic stabilizer is selected from the group consisting of guar gum, locust bean gum, tara gum, konjac, unmodified starches, unmodified cellulose, methylcellulose, ethylcellulose and combinations thereof; wherein the non-ionic emulsifiers are selected from the group consisting of polysorbates, sorbitan monostearate and combinations thereof; and wherein the edible acid is selected from the group consisting of phosphoric acid, hydrochloric acid, sulfuric acid, lactic acid, citric acid and combinations thereof.

11. The foam in accordance with claim 4, wherein the hard fat is a blend of coconut oil and palm kernel oil and the edible acid is phosphoric acid and the non-ionic stabilizer is guar gum.

12. The foam in accordance with claim 4, wherein the non-ionic emulsifier contained in the emulsion component is a blend of polysorbate and sorbitan monostearate and the non-ionic emulsifier contained in the acidic component is a polysorbate.

13. The foam in accordance with claim 4, wherein the milk protein source is selected from the group consisting of yogurt-cultured skim solids, and non-fat milk solids.

14. The foam in accordance with claim 1, wherein the whey protein is not functionalized by heat denaturation followed by hydrolysis.

15. The foam in accordance with claim 1, wherein the whey protein is whey protein concentrate, whey protein isolate, dried whey protein, and combinations thereof.

* * * * *